(12) United States Patent
La et al.

(10) Patent No.: US 8,737,477 B2
(45) Date of Patent: May 27, 2014

(54) FAST MOTION ESTIMATION METHODS USING MULTIPLE REFERENCE FRAMES

(75) Inventors: Byeong Du La, Suwon-si (KR); Hyun Wook Park, Daejeon (KR); Dong San Jun, Daejeon (KR)

(73) Assignee: Samsung Electronics Co., Ltd. (KR)

( * ) Notice: Subject to any disclaimer, the term of this patent is extended or adjusted under 35 U.S.C. 154(b) by 570 days.

(21) Appl. No.: 12/906,308

(22) Filed: Oct. 18, 2010

(65) Prior Publication Data

US 2011/0110429 A1 May 12, 2011

(30) Foreign Application Priority Data

Nov. 6, 2009 (KR) .................. 10-2009-0107191

(51) Int. Cl.
*H04N 7/12* (2006.01)
*H04N 11/02* (2006.01)
*H04N 11/04* (2006.01)
*H04N 7/36* (2006.01)
*H04N 7/32* (2006.01)
*H04N 7/50* (2006.01)
*H04N 7/26* (2006.01)
*H04N 5/14* (2006.01)

(52) U.S. Cl.
CPC ... *H04N 19/00587* (2013.01); *H04N 19/00569* (2013.01); *H04N 19/00781* (2013.01); *H04N 19/00375* (2013.01); *H04N 5/145* (2013.01); *H04N 7/50* (2013.01); *H04N 7/26244* (2013.01); *H04N 7/26765* (2013.01); *H04N 7/26015* (2013.01); *H04N 7/366* (2013.01); *H04N 7/26138* (2013.01); *H04N 7/26074* (2013.01)
USPC ............ 375/240.16; 375/240.12; 375/240.01; 375/240.26

(58) Field of Classification Search
CPC .................. H04N 19/00569; H04N 19/00587; H04N 19/00781; H04N 19/00375; H04N 7/50; H04N 7/26244; H04N 7/26765; H04N 7/26015; H04N 7/366; H04N 7/26138; H04N 7/26074; H04N 5/145
USPC ........................... 375/240.12, 240.01, 240.26
See application file for complete search history.

(56) References Cited

U.S. PATENT DOCUMENTS 6,892,163 B1 * 5/2005 Herzog et al. ................ 702/181
7,283,174 B2 * 10/2007 Tokuhara et al. ............. 348/448
2008/0252721 A1 * 10/2008 Suzuki ............................ 348/97

* cited by examiner

*Primary Examiner* — Geepy Pe
(74) *Attorney, Agent, or Firm* — Myers Bigel Sibley & Sajovec, P.A.

(57) ABSTRACT

Motion estimation methods using multiple reference frames are provided. In the methods, motion estimation is performed on a current block using a single reference frame selected from the multiple reference frames or using the multiple reference frames in order of probability that each reference frame is an optimal reference frame for the current block. Accordingly, faster motion estimation is performed.

6 Claims, 18 Drawing Sheets

X: CURRENT BLOCK
A, B, C, D: NEIGHBORING BLOCKS

CASE 1

CASE 2

CASE 3

CASE 4

NEIGHBORING BLOCKS OF TRP   NEIGHBORING BLOCKS OF SRP

FAST MOTION ESTIMATION METHODS USING MULTIPLE REFERENCE FRAMES

CROSS-REFERENCE TO RELATED APPLICATIONS

This application claims priority under 35 U.S.C. §119(e) to Korean Patent Application No. 10-2009-0107191 filed on Nov. 6, 2009, in the Korean Intellectual Property Office, the disclosure of which is incorporated by reference as if set forth, fully herein.

BACKGROUND

The present invention relates to image compression, and more particularly, to methods of efficiently reducing calculations during video signal compression.

With the development of mobile communications and satellite communications, wireless communication services have become more important in an information society. Multimedia wireless communication services are spread to provide wireless Internet access or video communications as well as transmission of voice or text information. Particularly, in the business of International Mobile Telecommunications-2000 (IMT-2000) and fourth-generation mobile communications using satellite digital multimedia broadcasting (DMB) systems, an environment enabling high picture quality moving pictures to be transmitted in real time has been built.

This technology has been commercialized due to the development of various image compression techniques by which an analog video signal is compressed and encoded into a digital signal and the digital signal is transmitted to and decoded by a receiver. Standardization of video signal coding has been led by a Moving Picture Experts Group (MPEG) under International Organization for Standardization/International Electro-technical Commission (ISO/IEC) and a Video Coding Experts Group (VCEG) under International Telecommunications Union Telecommunication Standardization sector (ITU-T). One of the latest video coding standards, H.264/Advanced Video Coding (AVC), was developed by a Joint Video Team (JVT) of ISO/IEC MPEG and ITU-T VCEG.

H.264/ACV introduces various techniques different from existing coding standards such as MPEG-2, MPEG-4, H.261, and H.263, thereby providing excellent compression capability. For instance, H.264/ACV codec performs motion estimation on a 4×4 block and can thus perform motion estimation on up to 16 4×4 blocks in a 16×16 macro block. As a result, H.264/ACV codec increases motion vector resolution to quarter-pixel precision, thereby enabling more precise motion estimation than existing codecs.

However, H.264/ACV codec calculates a residual signal between frames using multiple reference frames, thereby increasing the complexity of motion estimation compared to existing codecs. The increase of motion vector resolution also results in an increase in motion estimation complexity. The complexity of H.264/ACV makes it hard to adapt H.264/ACV to an application such as a real-time video encoder. Therefore, technology for efficiently reducing the complexity and maintaining high compression capability is desired. The above-described problems are not restricted to H.264/ACV but may be applied to compression techniques which will be adopted as standards.

SUMMARY

Some embodiments disclosed herein provide methods of performing fast motion estimation using multiple reference frames even when motion vector resolution increases. Methods of motion estimation using multiple reference frames may include analyzing multiple reference indexes of a current block. The reference indexes may indicate reference frames of respective ones of multiple neighboring blocks that have already been coded. Operations may include selecting, when all of the neighboring blocks have a same reference value, a single reference frame indicated by one of the reference indexes of the neighboring blocks from among the multiple reference frames and performing motion estimation on the current block using the single reference frame, when all of the neighboring blocks have a same reference index. Motion estimation may be performed on the current block using all of the multiple reference frames when all of the neighboring blocks do not have the same reference index.

In some embodiments, selecting the single reference frame and performing motion estimation using the single reference frame includes, when the current block is smaller than a size of a minimum block for which a reference index generated by the motion estimation method can be transmitted, performing motion estimation on the current block using a reference frame indicated by a reference index of the minimum block.

Some embodiments provide that selecting the single reference frame and performing the motion estimation using the single reference frame includes, even when all of the neighboring blocks have the same reference index, determining whether to select the single reference frame based on a size of the current block and neighboring blocks, positions of the neighboring blocks with respect to the current block, and the reference frame indicated by the reference index of the neighboring blocks.

Some embodiments provide that determining whether to select the single reference frame includes, when the size of ones of the current block and the neighboring blocks is smaller than a maximum block size for motion estimation, determining whether to select the reference frame indicated by the reference index of the neighboring blocks as the single reference frame based on whether a reference index of an upper-layer block of the current block is the same as the reference index of ones of the neighboring blocks.

Some embodiments of the present invention include motion estimation methods using multiple reference frames. Such methods may include analyzing multiple reference indexes of a current block, the reference indexes indicating multiple reference frames of multiple neighboring blocks that have already been coded. Operations may include analyzing the reference indexes of a block corresponding to the current block and its neighboring blocks in a previous frame. Methods may include selecting a single reference frame from the reference frames based on a value of linear combination of the number of first blocks that have a same reference index among the neighboring blocks of the current block, and the number of second blocks that have the same reference index among the block corresponding to the current block and its neighboring blocks in the previous frame and performing motion estimation on the current block using the selected single reference frame.

In some embodiments, performing the motion estimation using the single reference frame includes performing motion estimation on the current block using the one of the reference frames indicated by the same reference index when the value of linear combination is greater than a predetermined threshold value. Operations may further include performing motion estimation on the current block using all of the reference frames when the value of linear combination is not greater than a predetermined threshold value.

Some embodiments provide that selecting the single reference frame includes multiplying the number of first blocks and the number of second blocks by different weights, respectively and that the weight for the number of first blocks is greater than the weight for the number of second blocks.

Some embodiments of the present invention include motion estimation methods using multiple reference frames. Such methods may include estimating a norm of a motion vector of a current block based on a norm of an average motion vector of multiple neighboring blocks of the current block and calculating a posterior probability of the estimated norm of the motion vector of the current block with respect to each of the reference frames using the estimated norm of the motion vector of the current block as a feature vector. Methods may include selecting a reference frame giving a maximum posterior probability as a reference frame for the current block and performing motion estimation on the current block using the selected reference frame.

In some embodiments, estimating the norm of the motion vector of the current block includes generating multiple training samples representing relations between a norm of a measured motion vector of the current block and a norm of an average motion vector of the neighboring blocks estimating the norm of the average motion vector of the neighboring blocks that corresponds to the one of the training samples that has a minimum error among the training samples as the norm of the motion vector of the current block.

Some embodiments provide that calculating the posterior probability includes calculating a prior probability of the estimated norm of the motion vector of the current block with respect to each reference frame, calculating a probability density function of the estimated not of the motion vector of the current block with respect to the reference frame, and calculating the posterior probability of the estimated norm of the motion vector of the current block with respect to the reference frame based on the prior probability and the probability density function.

In some embodiments, methods of motion estimation using a plurality of reference frames may include analyzing multiple reference indexes of a current block. The reference indexes may indicate reference frames of neighboring blocks that have already been coded. Multiple reference indexes of a block corresponding to the current block and its neighboring blocks in a previous frame may be analyzed. Methods may include performing a first linear combination of a number of first blocks that have a same reference index among the neighboring blocks of the current block and a number of second blocks that have the same reference index among the block corresponding to the current block and its neighboring blocks in the previous frame. Operations may include estimating a norm of a motion vector of the current block based on a norm of an average motion vector of the neighboring blocks of the current block, calculating a posterior probability of the estimated norm of the motion vector of the current block with respect to each of the reference frames using the estimated norm of the motion vector of the current block as a feature vector, and performing a second linear combination of a value of the first linear combination and the posterior probability of the estimated norm of the motion vector of the current block with respect to each reference frame and performing motion estimation on the current block sequentially using the plurality of reference frames according to values of the second linear combination.

In some embodiments, performing the first linear combination includes multiplying the number of first blocks and the number of second blocks by different weights, respectively. A weight for the number of first blocks may be greater than a weight for the number of second blocks.

Some embodiments provide that performing the second linear combination and performing the motion estimation include multiplying the value of the first linear combination and the posterior probability by different weights, respectively. The weight for the second linear combination may be greater than the weight for the posterior probability.

In some embodiments, estimating the norm of the motion vector of the current block includes generating multiple training samples representing relations between a norm of a measured motion vector of the current block and a norm of an average motion vector of the neighboring blocks and estimating a norm of an average motion vector of the neighboring blocks that corresponds to a training sample having a minimum error among the training samples, as the norm of the motion vector of the current block.

Some embodiments provide that calculating the posterior probability includes calculating a prior probability of the estimated norm of the motion vector of the current block with respect to each reference frame, calculating a probability density function of the estimated norm of the motion vector of the current block with respect to the reference frame, and calculating the posterior probability of the estimated norm of the motion vector of the current block with respect to the reference frame based on the prior probability and the probability density function.

Some embodiments provide that motion estimation methods using multiple reference frames may include analyzing multiple reference indexes of a current block. The reference indexes may indicate the reference frames of multiple neighboring blocks that have already been coded. Multiple reference indexes of a block corresponding to the current block and its multiple neighboring blocks in a previous frame may be analyzed. Operations may include determining whether to select a single reference frame from the reference frames based whether all of the neighboring blocks have a same reference index, on a size of the current and the neighboring blocks, on respective positions of the neighboring blocks with respect to the current block, and the reference frame indicated by the one of the reference indexes of the neighboring blocks. When it is determined that the single reference frame is selected from among the reference frames, a motion estimation may be performed on the current block using the single reference frame. When it is determined that the single reference frame is not selected, operations may include performing a linear combination of a posterior probability of a norm of a motion vector of the current block that is estimated based on whether the neighboring blocks of the current block and the block corresponding to the current block and its neighboring blocks in the previous frame have a same reference index as a motion vector of the neighboring blocks of the current block, with respect to each of the reference frames and performing motion estimation on the current block using the reference frames in order of values of the linear combination.

Some embodiments provide that performing the linear combination and performing the motion estimation include performing a first linear combination of a number of first blocks that have a same reference index among the neighboring blocks of the current block, and a number of second blocks that have a same reference index among the block corresponding to the current block and its neighboring blocks in the previous frame. The norm of the motion vector of the current block may be estimated based on a norm of an average motion vector of the neighboring blocks of the current block. The posterior probability of the estimated norm of the motion vector of the current block with respect to each reference frame may be calculated using the estimated norm of the motion vector of the current block as a feature vector. Motion estimation on the current block may be performed sequentially using the reference frames according to values of a second linear combination of a value of the first linear combination and the posterior probability of the estimated norm of the motion vector of the current block with respect to each reference frame.

In some embodiments, estimating the norm of the motion vector of the current block includes generating multiple training samples representing relations between a norm of a measured motion vector of the current block and a norm of an average motion vector of the neighboring blocks. Methods may include estimating a norm of an average motion vector of the neighboring blocks that corresponds to a training sample having a minimum error among the training samples, as the norm of the motion vector of the current block.

Some embodiments provide that calculating the posterior probability includes calculating a prior probability of the estimated norm of the motion vector of the current block with respect to each reference frame, calculating a probability density function of the estimated norm of the motion vector of the current block with respect to the reference frame, and calculating the posterior probability of the estimated norm of the motion vector of the current block with respect to the reference frame based on the prior probability and the probability density function.

Some embodiments provide that operations as described herein may be performed via a computer readable storage medium including executable code.

Motion estimation methods as described herein may be manifested by executing a computer program, for performing the method, stored in a non-transitory computer readable medium.

It is noted that aspects of the invention described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Figure 1:
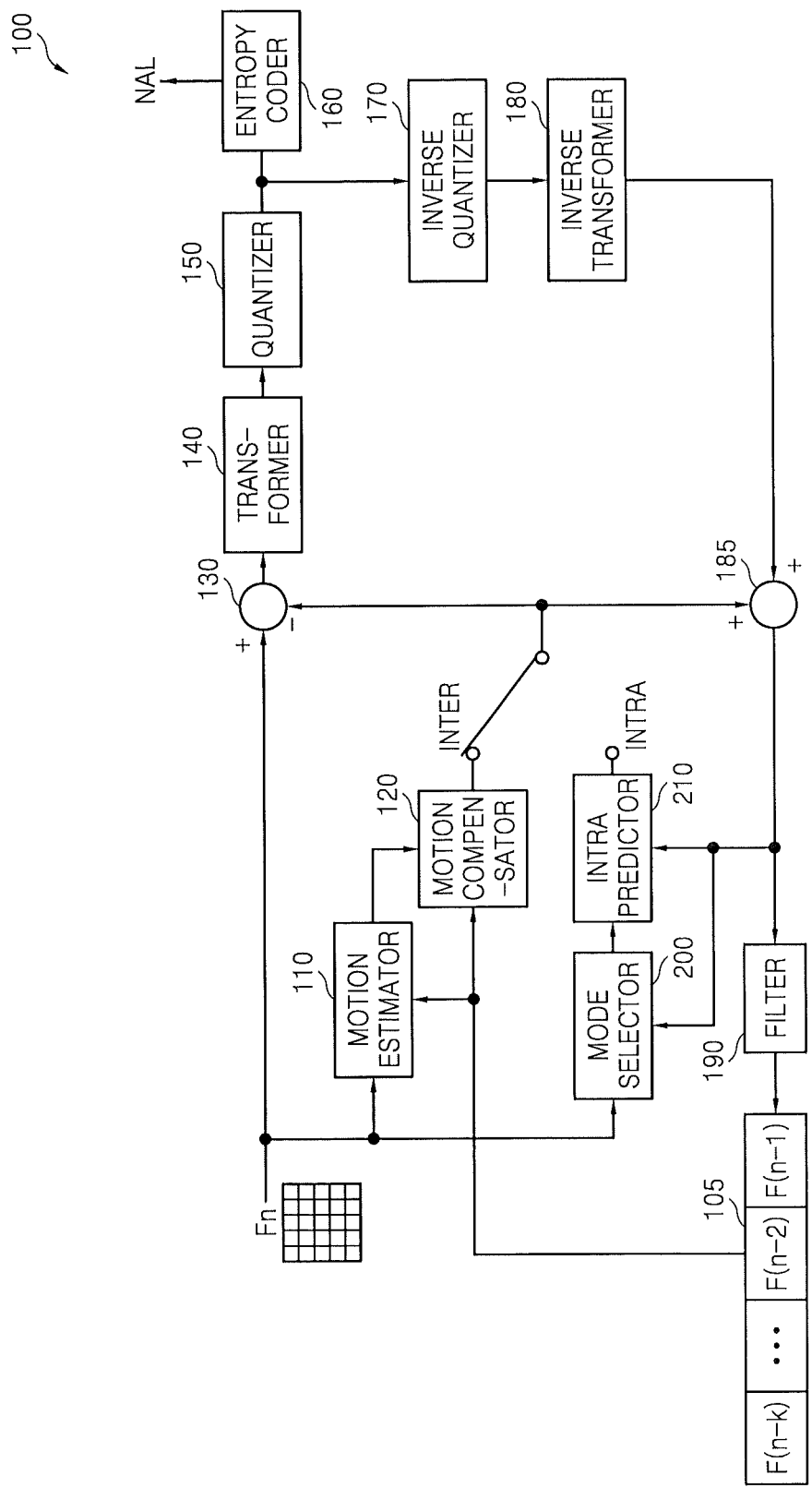
FIG. 1 is a block diagram of an H.264/AVC encoder according to some embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art.

It will be understood that, although the terms first, second, etc. may be used herein to describe various elements, these elements should not be limited by these terms. These twins are only used to distinguish one element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one or more stated elements, steps and/or functions without precluding one or more unstated elements, steps and/or functions. The term "and/or" includes any and all combinations of one or more of the associated listed items.

It will also be understood that when an element is referred to as being "connected" to another element, it can be directly connected to the other element or intervening elements may be present. In contrast, when an element is referred to as being "directly connected" to another element, there are no intervening elements present. It will also be understood that the sizes and relative orientations of the illustrated elements are not shown to scale, and in some instances they have been exaggerated for purposes of explanation. Like numbers refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein. The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art.

It should be construed that forgoing general illustrations and following detailed descriptions are exemplified and an additional explanation of claimed inventions is provided.

Reference numerals are indicated in detail in some embodiments of the present invention, and their examples are represented in reference drawings. Throughout the drawings, like reference numerals are used for referring to the same or similar elements in the description and drawings.

Reference is now made to FIG. 1, which is a block diagram of an H.264/Advanced Video Coding (AVC) encoder 100 according to some embodiments of the present invention. Video coding of H.264/AVC is divided into intra coding using spatial similarity between blocks in a frame and inter coding using similarity between frames with temporal difference. In other words, a video signal is encoded in an intra or an inter mode in the encoder 100. Referring to FIG. 1, the encoder 100 includes a frame storage unit 105, a motion estimator 110, a motion compensator 120, a differential circuit 130, a transformer 140, a quantizer 150, an entropy coder 160, an inverse quantizer 170, an inverse transformer 180, an adder 185, a filter 190, a mode selector 200, and an intra predictor 210.

Figure 2:
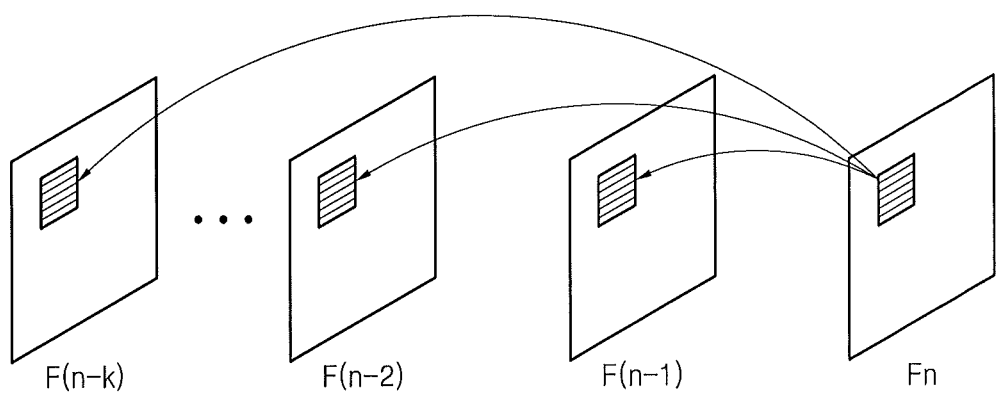
FIG. 2 is a conceptual diagram of the principle of multiple reference frames.

The motion estimator 110 performs motion estimation on a current frame Fn based on a plurality of frames F(n−1), F(n−2), F(n−k) stored in the frame storage unit 105 in the inter mode. In other words, the motion estimator 110 performs motion estimation using the plurality of reference frames instead of a single reference frame, which may be referred to as motion estimation using multiple reference frames. FIG. 2 is a conceptual diagram of the principle of multiple reference frames. It can be seen from FIG. 2 that the motion estimator 110 performs motion estimation on the current frame Fn using the multiple reference frames F(n−1) through F(n−k).

Motion estimation may include a procedure for finding a motion vector with respect to multiple blocks and macroblock mode decision for finding an optimal macroblock type having the least bit rate and the least error with respect to the multiple blocks. The motion compensator 120 generates a compensated frame for the current frame Fn based on the multiple reference frames F(n−1) through F(n−k) according to the motion vector and the macroblock mode type which result from the motion estimation performed by the motion estimator 110. The differential circuit 130 generates and outputs a differential signal based on the current frame Fn and the compensated frame output from the motion compensator 120.

The differential signal output from the differential circuit 130 is subjected to discrete cosine transform (DCT) by the transformer 140 and quantization by the quantizer 150. The entropy coder 160 encodes a signal output from the quantizer 150 and outputs an encoded bit stream NAL. The signal output from the quantizer 150 is restored after being subjected to inverse quantization by the inverse quantizer 170 and inverse DCT by the inverse transformer 180. The restored frame may be stored in the frame storage unit 105 via the adder 185 and the filter 190. When the mode of the encoder 100 is converted into the intra mode by the mode selector 200, the intra predictor 210 performs intra prediction on a macroblock based on neighboring blocks and obtains a compensated frame from the intra-prediction result.

Figure 3:
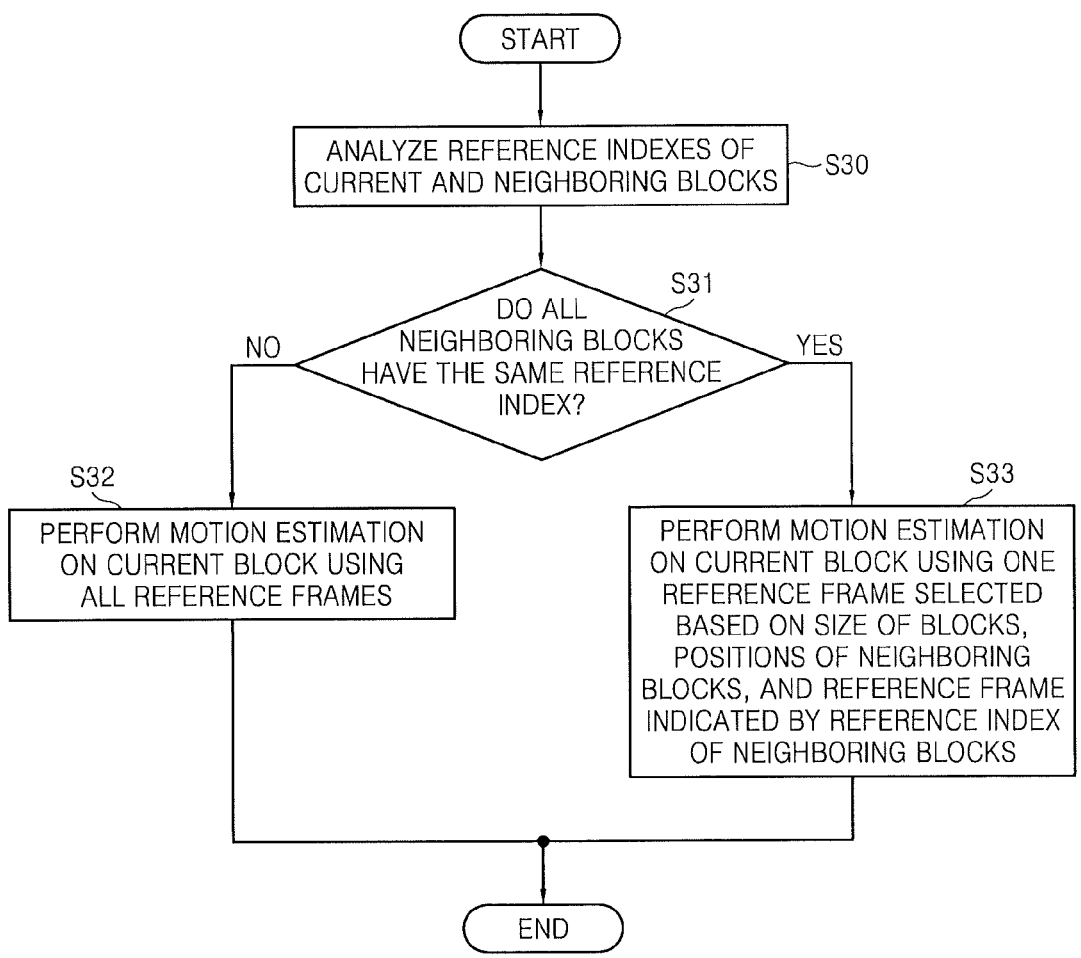
FIG. 3 is a flowchart of a motion estimation method using multiple reference frames according to some embodiments of the present invention.

Reference is now made to FIG. 3, which is a flowchart of a motion estimation method using multiple reference frames according to some embodiments of the present invention. In the motion estimation method illustrated in FIG. 3, instead of using all multiple reference frames, motion estimation is performed on only one reference frame selected based on information about neighboring blocks of a current block in a current coded frame. Here, motion estimation is performed using similarities in the magnitude and the direction of a motion vector and in the sum of absolute differences (SAD) between a current block and its neighboring coded blocks, that is, motion estimation is performed using neighboring reference-frame correlation (NRFC) between the current block and its neighboring blocks. Hereinafter, it will be described that NRFC is an appropriate feature to determine a reference frame for the motion estimation of a current block.

According to the H.264/AVC standard, a reference index indicating a reference frame is transmitted to a decoder per at least an 8×8 block during motion estimation using multiple reference frames. The reference index is information provided to prevent mismatch between encoding and decoding.

Figure 4:
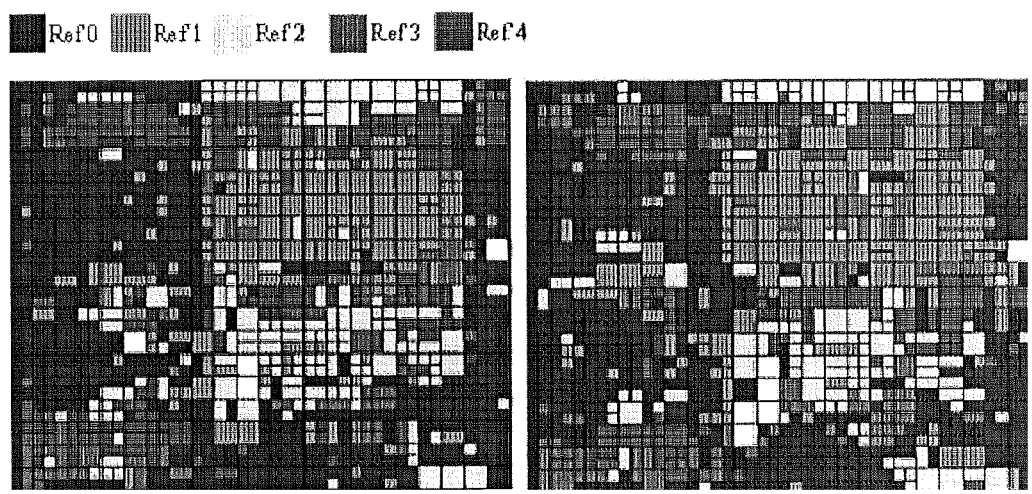
FIG. 4 is a diagram provided to explain the correlation of consecutive frames with multiple reference frames.

FIG. 4 is a diagram provided to explain the correlation of consecutive frames with multiple reference frames. Referring to FIG. 4, an optimal reference frame for a current block has significant correlation with an optimal reference frame for neighboring blocks that has already been encoded and the current block has significant correlation with an inter-frame/intra-frame index between the consecutive frames. Here, the diagram illustrated in FIG. 4 shows a case where the encoder 100 uses a total of five reference frames for motion estimation. Ref0 denotes a previous frame right before a current frame and Ref4 is a previous frame farthest away from the current frame among reference frames Ref0 through Ref4.

Figure 5:
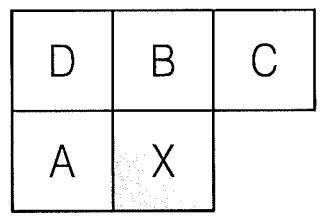
FIG. 5 is a diagram of an example of a current block and its neighboring blocks which are used in the motion estimation method illustrated in FIG. 3.

Strong correlation with NRFC within a frame may be verified in terms of a formula based on a probability model. When the distribution of a reference index used in video sequences is actually analyzed, the closer a reference frame is to a current frame, the higher the probability that the reference frame is selected as an optimal reference frame for a block to be encoded in the current frame. As the reference frame is farther away from the current frame, the probability that the reference frame is selected as an optimal reference frame sharply decreases. FIG. 5 is a diagram of an example of a current block X and its neighboring blocks A, B, C, and D, which are used in the motion estimation method illustrated in FIG. 3.

When a reference frame index $i_x$ for the current block X is defined as a random variable, a probability distribution of the reference frame index $i_x$ is defined by an exponential distribution expressed by Equation (1):

$$P(i_X; X) = P_X(i_X) = \frac{e^{-a(i_X+1)}}{\sum_{j=0}^{r-1} e^{-a(j+1)}} \quad (1)$$

$$\sum_{k=0}^{r-1} P_X(i_X) =$$

$$\sum_{k=0}^{r-1} P_X(i_X = k)\hat{P}_k(N) + \sum_{k=0}^{r-1} P_X(i_X = k)\hat{P}_k^C(N) = \Gamma_N + \Gamma_N^C,$$

for $i_X \in R$, $R = \{0, \ldots, r-1\}, a > 0,$ where r is the number of reference frames and $\hat{P}_k(N)$ is the probability of neighboring blocks with respect to a reference index k. $P_X(i_X=k)\hat{P}_k(N)$ represents NRFC between the current block X and its neighboring blocks to the reference index k, that is, the probability that a reference frame of at least one among the neighboring blocks has the reference index k when the current block X has the reference index k. $\hat{P}_k^C(N)$ is the probability that the neighboring blocks do not have the reference index k and $P_X(i_X=k)\hat{P}_k^C(N)$ is the probability that any of the neighboring blocks do not have the reference index k when the current block X has the reference index k. The term $\Gamma_N$ denoting NRFC in Equation (1) may be written as Equation (2):

$$\Gamma_N = P_X(i_X = 0)\left\{1 - \prod_{l=A}^{D}(1 - P_l(i_l = 0))\right\} + \quad (2)$$

$$\ldots \ldots + P_X(i_X = r-1)\left\{1 - \prod_{l=A}^{D}(1 - P_l(i_l = r-1))\right\} =$$

$$\frac{1}{\sum_{j=0}^{r-1} e^{-a(j+1)}}\left\{\left(\frac{e^{-a} - e^{-a(r+1)}}{1 - e^{-a}}\right) - \sum_{k=1}^{r} e^{-ak}\left(1 - \frac{e^{-ak}}{\sum_{j=0}^{r-1} e^{-a(j+1)}}\right)^4\right\}.$$

Figure 6:
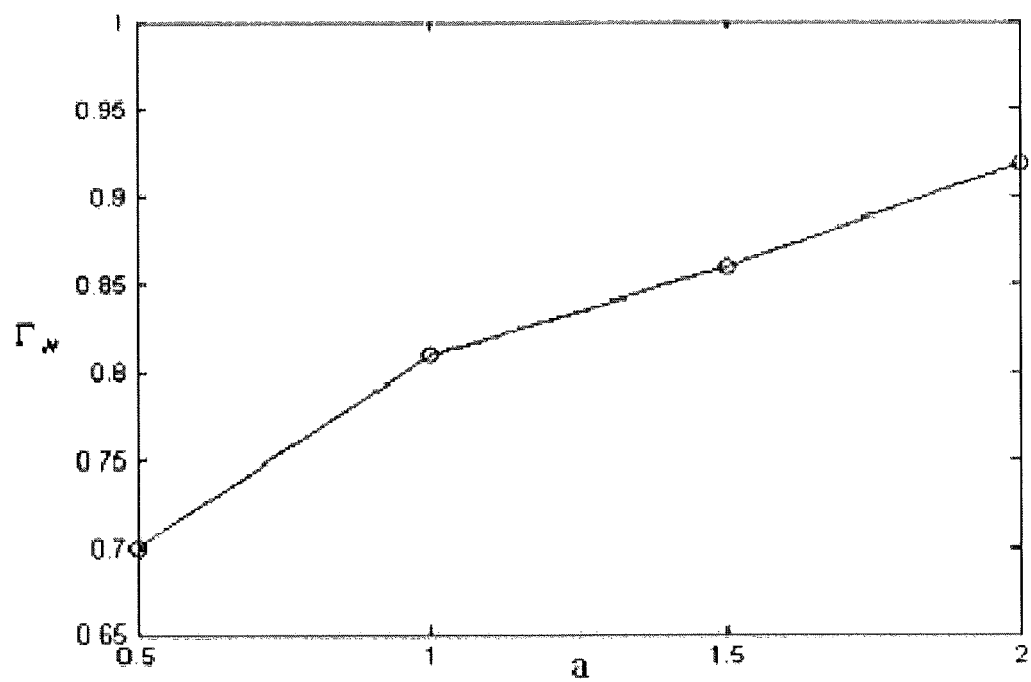
FIG. 6 is a graph showing neighboring reference frame correlation (NRFC) between a current block and its neighboring blocks with respect to variable $\alpha$.

FIG. 6 is a graph of NRFC versus variable a in Equation (2). Referring to FIG. 6, NRFC with respect to the variable a has a similar distribution to an exponential distribution analyzed through experiments, which indicates that NRFC is an appropriate feature to determine an optimal reference frame for the current block X.

As described above, NRFC may be an important feature in determining a reference frame for a current block. Hereinafter, motion estimation performed by the motion estimator 110 will be described with reference to FIGS. 1, 3, and 5.

The motion estimator 110 analyzes a reference index indicating a reference frame for each of the neighboring coded blocks A through D of the current block X in operation S30 and determines whether the neighboring blocks A through D have the same reference index in operation S31. When it is determined that the neighboring blocks A through D do not have the same reference index, the motion estimator 110 performs motion estimation on the current block X using all reference frames (e.g., Ref0 through Ref4) in operation S32

When it is determined that the neighboring blocks A through D have the same reference index, the motion estimator 110 selects one reference frame indicated by the reference index of the neighboring blocks A through D from among the reference frames Ref0 through Ref4 and performs motion estimation on the current block X using the selected reference frame in operation S33. At this time, even through all neighboring blocks A through D have the same reference index, the motion estimator 110 may determine whether to select the reference frame based on a size of the current and neighboring blocks X and A through D, positions of the neighboring blocks A through D with respect to the current block X, and the reference frame indicated by the reference index of the neighboring blocks A through D.

In addition, when the size of the current and neighboring blocks X and A through D is smaller than the size of a minimum block for which a reference index generated through the motion estimation can be transmitted, only reference frames indicated by a reference index of the minimum block is used to perform motion estimation on the current block X. For instance, for blocks smaller than a size of 8×8, motion estimation may be performed using reference frames having the size of 8×8 in H.264/AVC since a reference index can be transmitted only for blocks having at least a size of 8×8 in H.264/AVC.

Also, even when the neighboring blocks A through D have the same reference index, if the size of the current and neighboring blocks X and A through D is smaller than a maximum size of a block on which motion estimation is performed, the motion estimator 110 may select a reference frame indicated by the reference index of the neighboring blocks A through D as a single reference frame used for motion estimation based on whether a reference index of the current block X and its upper-layer block is the same as that of the neighboring blocks A through D. The position of the neighboring blocks A through D with respect to the current block X may also be considered.

Figure 7:
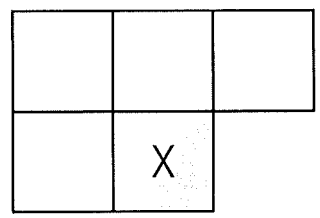
FIG. 7 a diagram of different arrangements of a current block and its neighboring blocks which are used in the motion estimation method illustrated in FIG. 3.
Figure 7:
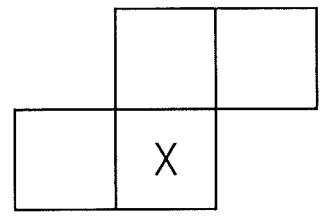
Figure 7:
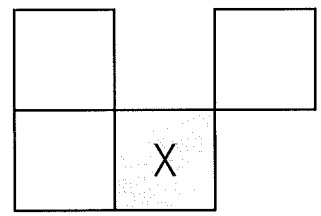
Figure 7:
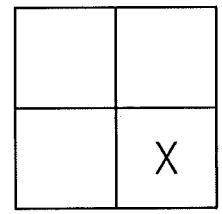

FIG. 7 is a diagram of different arrangements of a current block and its neighboring blocks, which are used in the motion estimation methods as illustrated in FIG. 3. The motion estimation performed by the motion estimator 110 will be described in detail with reference to FIGS. 1, 3, and 7.

Tables 1 and 2 show the results of experiments of determining optimal reference frames for a current 16×8 or 8×16 block and for a current 8×8 block, respectively, according to H.264/AVC when neighboring blocks have the same reference index in each of cases 1 through 4 illustrated in FIG. 7.

TABLE 1

|      | Case 1 | Case 2 | Case 3 | Case 4 |
|------|--------|--------|--------|--------|
| Ref0 | O      | R      | R      | O      |
| Ref1 | X      | X      | X      | O      |
| Ref2 | X      | X      | X      | O      |
| Ref3 | X      | X      | X      | O      |
| Ref4 | X      | X      | X      | O      |

16 × 8 or 8 × 16 block (O: Enable, X: Disable, R: Refinement)

TABLE 2

|       | Case 1 | Case 2 | Case 3 | Case 4 |
|-------|--------|--------|--------|--------|
| Ref 0 | O      | O      | X      | O      |
| Ref 1 | O      | X      | X      | O      |
| Ref 2 | O      | X      | X      | O      |
| Ref 3 | O      | X      | X      | R      |
| Ref 4 | O      | X      | X      | R      |

8 × 8 block (O: Enable, X: Disable, R: Refinement)

The bold box in Table 2 means that if all neighboring blocks of the current 8×8 block X have the same reference index indicating the reference frame Ref2 in case 1, the motion estimator 110 performs motion estimation on the current 8×8 block X using only the reference frame Ref2 instead of using all five reference frames Ref0 through Ref4. When motion estimation is performed on blocks smaller than 8×8, the reference frame Ref2 used for the current 8×8 block X is used according to H.264/AVC because 8×8 is the minimum size of a block for which reference index information can be transmitted in H.264/AVC. This operation may be applied to all cases of Enable (○) in Tables 1 and 2.

In a case of a box at the right of the bold box in Table 2, even if all neighboring blocks of the current 8×8 block X have the same reference index indicating the reference frame Ref2 in case 2, the motion estimator 110 performs motion estimation on the current 8×8 block X using all five reference frames Ref0 through Ref4 instead of using only the reference frame Ref2. This operation may be applied to all cases of Disable (X) in Tables 1 and 2.

In case 4 in Table 2, only when all neighboring blocks of the current 8×8 block X have the same reference index indicating the reference frame Ref3 and an upper-layer block for the current block X has the same reference index as the neighboring blocks, the motion estimator 110 performs motion estimation using only the reference frame Ref3. Otherwise, the motion estimator 110 performs motion estimation using all five reference frames Ref0 through Ref4. This operation is applied to all cases of Refinement (R) in Tables 1 and 2.

Table 3 defines upper-layer blocks for current blocks in cases of Refinement (R).

TABLE 3

| | Refinement Ref |
|---|---|
| 1st block of Inter__16 × 8 | Best ref. of Inter__16 × 16 |
| 2nd block of Inter__16 × 8 | Best ref. of 1st Inter__16 × 8 |
| 1st block of Inter__8 × 16 | Best ref. of Inter__16 × 16 |
| 2nd block of Inter__8 × 16 | Best ref. of 1st Inter__8 × 16 |
| 1st block of Inter__8 × 8 | Best ref. of upper best mode |
| 2nd block of Inter__8 × 8 | Best ref. of upper best mode |
| 3rd block of Inter__8 × 8 | Best ref. of upper best mode |
| 4th block of Inter__8 × 8 | Best ref. of upper best mode |

Referring to Table 3, when a macroblock is 16×16 in size, an upper-layer block for the first 16×8 block and the first 8×16 block is a 16×16 macroblock; an upper-layer block for the second 16×8 block is the first 16×8 block; and an upper-layer block for the second 8×16 block is the first 8×16 block. In addition, an upper-layer block for each of the first through fourth 8×8 blocks is one block among the 16×16 macroblock, the 16×8 blocks, and the 8×16 blocks, which include each 8×8 block.

As described above, according to the motion estimation method illustrated in FIG. 3, a single optimal reference frame may be selected for a current block from among multiple reference frames using NRFC and motion estimation may be performed using only the selected reference frame without using the other reference frames, so that the motion estimation is performed faster as compared to conventional motion estimation using multiple reference frames.

Figure 8:
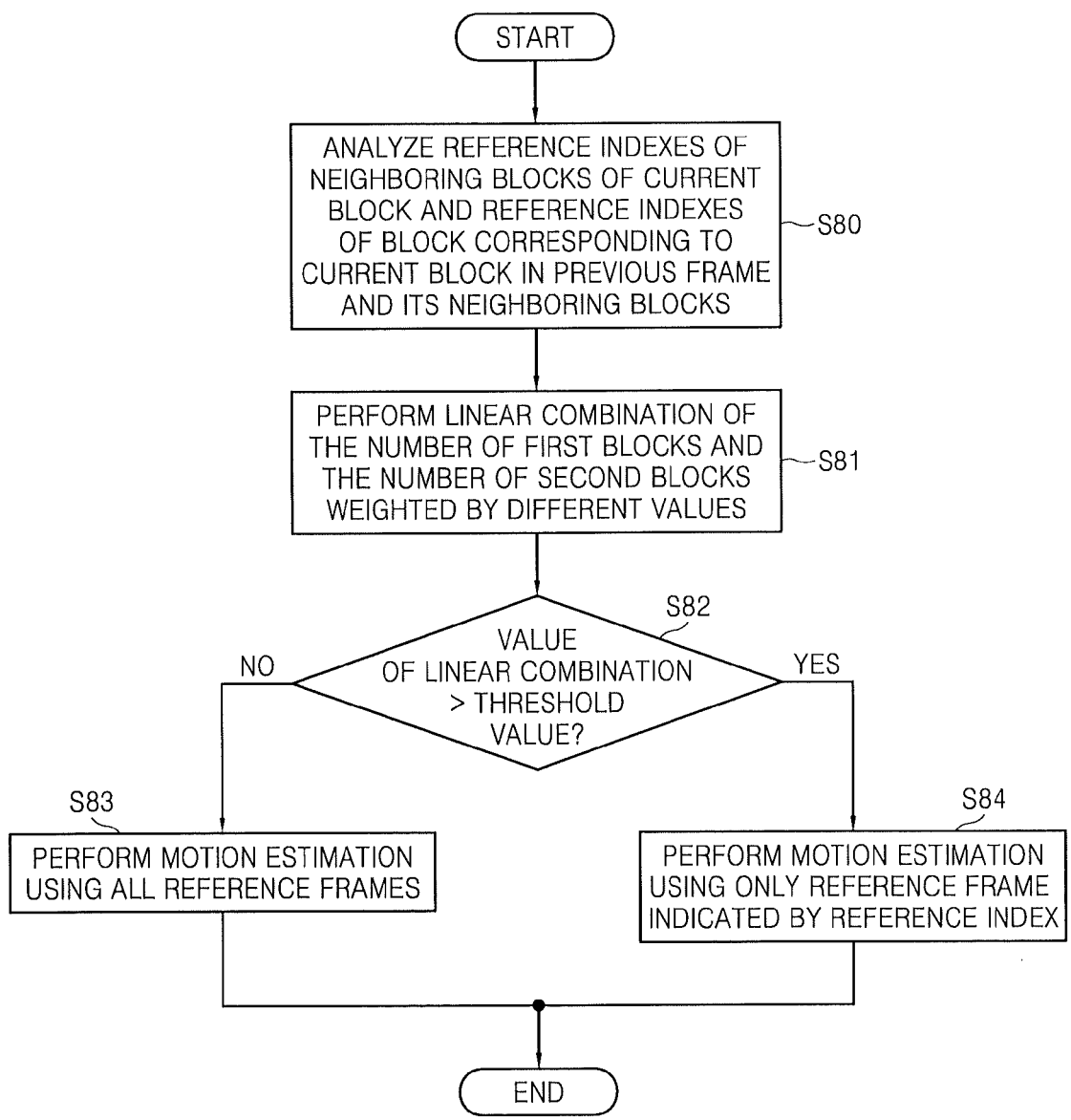
FIG. 8 is a flowchart of a motion estimation method using multiple reference frames according to other embodiments of the present invention.
Figure 9:
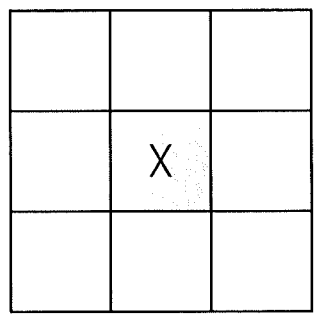
FIG. 9 is a diagram showing blocks of a current frame and a previous frame which are used in the motion estimation method illustrated in FIG. 8.
Figure 9:
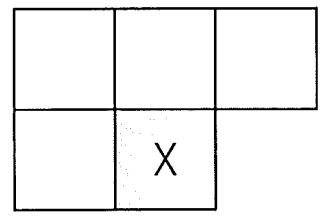

Reference is now made to FIG. 8, which is a flowchart of motion estimation methods using multiple reference frames according to some embodiments of the present invention. In some embodiments, the motion estimation methods illustrated in FIG. 8 uses NRFC in a current frame and NRFC between the current frame and a previous frame. FIG. 9 is a diagram showing blocks of a current frame and a previous frame which are used in the motion estimation methods illustrated in FIG. 8. The motion estimation methods illustrated in FIG. 8 will be described in detail with reference to FIGS. 1, 8, and 9 below.

The motion estimator 110 analyzes the reference indexes of neighboring coded blocks of a current block X and the reference indexes of a block X' corresponding to the current block X in the previous frame and of neighboring blocks of the block X' in operation S80 and calculates a value of a linear combination of the number of first blocks having the same reference index among the neighboring blocks of the current block X and the number of second blocks having the same reference index among the block X' and its neighboring blocks in the previous frame in operation S81. When the value of the linear combination is calculated, different weights may be applied to the number of first blocks and the number of second blocks. For instance, a weight for the number of first blocks may be greater than that for the number of second blocks to give more priority to the NRFC of the current block X over the NRFC of the block X' of the previous frame in selecting a reference frame for the current block X. Some embodiments provide that the performed linear combination may be represented with RP and expressed by Equation (3):

$$RP[\text{ref\_idx}] = \frac{SRP[\text{ref\_idx}] + \frac{TRP[\text{ref\_idx}]}{3}}{\text{Max}\left\{SRP[k] + \frac{TRP[k]}{3}\right\}}, \quad (3)$$

for ref_idx, $k \in \{0, 1, \ldots, r-1\}$, where SRP[ref_idx] is the number of first blocks having a reference index of ref_idx among four neighboring coded blocks of the current block X and TRP[ref_idx] is the number of second blocks having a reference index of ref_idx among the block X' corresponding to the current block X and its neighboring blocks in the previous frame. Referring to Equation (3), a weight for the number of first blocks is three times greater than a weight for the number of second blocks and the linear combination RP of the number of first block and the number of second block is normalized to a maximum value of 1, but the present invention is not limited thereto.

After calculating the value of the linear combination RP of the first and second blocks, the motion estimator 110 determines whether the value of the linear combination RP is greater than a predetermined threshold value in operation S82. The motion estimator 110 selects one reference frame from among multiple reference frames based on the result of determination and performs motion estimation on the current block X using the one selected reference frame in operation S83 or S84.

In detail, when the value of the linear combination RP of the number of first blocks and the number of second blocks is greater than the threshold value, the motion estimator 110 performs motion estimation on the current block X using only a reference frame indicated by the same reference index in operation S84. However, when the value of the linear combination RP of the number of first blocks and the number of second blocks is not greater than the threshold value, the motion estimator 110 performs motion estimation on the current block X using all reference frames in operation S83.

As described above, according to the motion estimation method illustrated in FIG. 8, one optimal reference frame may be selected from among multiple reference frames for a current block based on NRFC of the current block. A NRFC of a block corresponding to the current block in a previous frame and motion estimation may be performed using only the selected reference frame without using the other reference frames, so that the motion estimation can be performed faster compared to conventional motion estimation using multiple reference frames.

Figure 10:
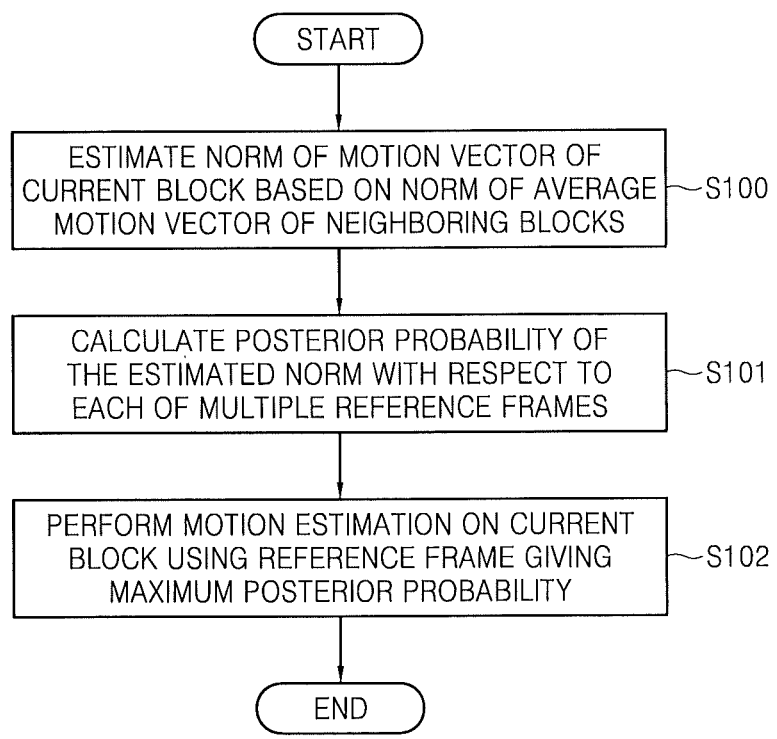
FIG. 10 is a flowchart of a motion estimation method using multiple reference frames according to further embodiments of the present invention.

Reference is now made to FIG. 10, which is a flowchart of motion estimation methods using multiple reference frames according to some embodiments of the present invention. In the motion estimation methods illustrated in FIG. 10, a norm of a motion vector of a current block is estimated and an optimal reference frame for the current block is determined by applying a Bayes decision theory to the estimated norm of the motion vector.

When the Bayes decision theory is applied to the motion estimation method illustrated in FIG. 10, the motion estimator 110 calculates a posterior probability of a norm of a motion vector of a current block with respect to multiple reference frames using the norm of the motion vector of the current block as a feature vector, selects a reference frame giving a maximum posterior probability, and performs motion estimation on the current block using the selected reference frame.

The norm of the motion vector NMV of the current block is expressed by Equation (4):

$$NMV = \sqrt{MV_x^2 + MV_y^2}, \quad (4)$$

where $MV_x$ is an x component of the motion vector of the current block and $MV_y$ is a y component of the motion vector of the current block.

A posterior probability $P(w_j|x)$ of the norm of the motion vector of the current block with respect to multiple reference frames is expressed by Equation (5):

$$P(\text{ref\_idx}|NMV) = \frac{P(NMV|\text{ref\_idx}) \cdot P(\text{ref\_idx})}{P(NMV)}, \quad (5)$$

for $\text{ref\_idx} \in \{0, 1, \ldots, r-1\}$, where NMV is the norm of the motion vector of the current block, P(NMV|ref_idx) is a probability density function (PDF) of the NMV with respect to a reference index ref_idx, P(ref_idx) is a prior probability of a reference frame, and P(NMV) is a probability of the norm of the motion vector of the current block.

Figure 11A:
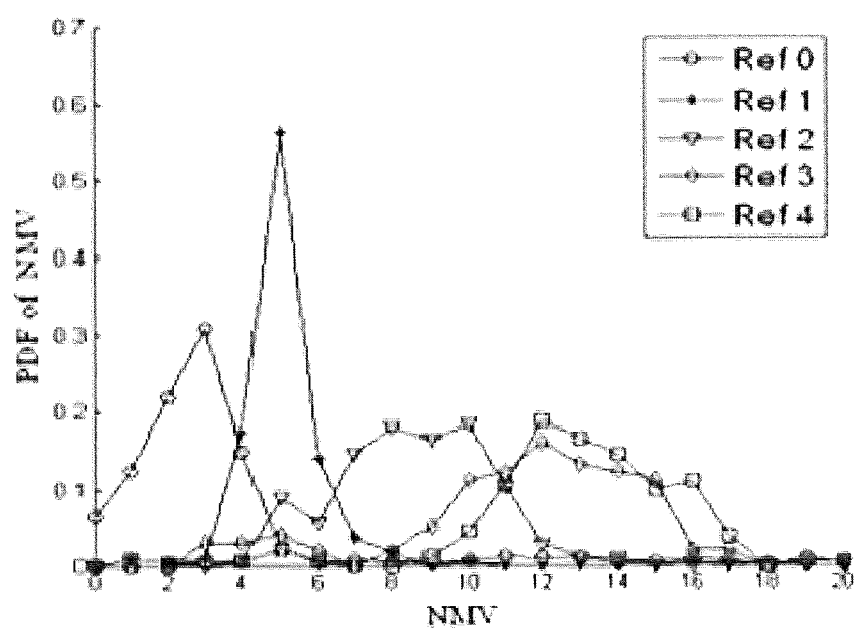
FIGS. 11A and 11B are graphs showing the probability density function (PDF) of the estimated norm of a current block with respect to multiple reference frames for consecutive frames, respectively, according to the motion estimation method illustrated in FIG. 10.
Figure 11B:
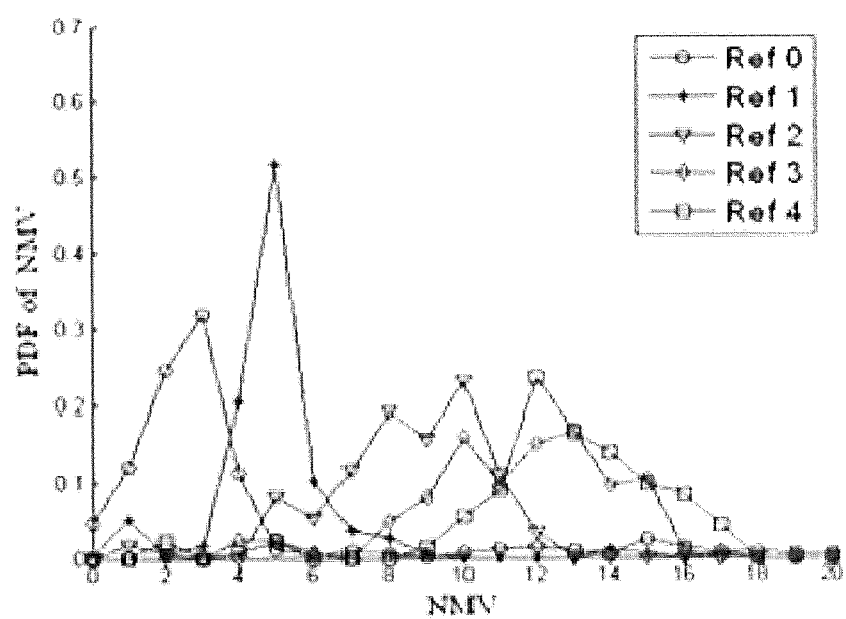

FIGS. 11A and 11B are graphs showing the PDF of the estimated norm of a current block with respect to multiple reference frames for consecutive frames (e.g., fifth and sixth frames), respectively, according to the motion estimation method illustrated in FIG. 10. Referring to FIGS. 11A and 11B, the PDF in one frame shows a different distribution with respect to reference frames and the PDF shows similar distributions between the consecutive frames with respect to the same reference frame. Accordingly, the motion estimator 110 may obtain a norm of a motion vector of a current block, compare posterior probabilities of the norm of the motion vector of the current block with respect to multiple reference frames based on the Bayes decision theory, and select an optimal reference frame for the current block. Here, the motion estimator 110 may not calculate a true motion vector of the current block before the current block is coded, but can estimate the motion vector of the current block from motion vectors of neighboring blocks which have already been coded.

As described above, a norm of an estimated motion vector of a current block may be an important feature in determining an optimal reference frame. Hereinafter, the motion estimation method illustrated in FIG. 10 will be described in detail with reference to FIGS. 1 and 10.

The motion estimator 110 estimates a norm of a motion vector of a current block based on a norm of an average motion vector of neighboring blocks of the current block in operation S100. Some embodiments provide that the norm of the motion vector of the current block may be estimated based on training samples indicating relations between a norm of the current block's true motion vector calculated through an experiment and the norm of the average motion vector of the neighboring blocks.

More specifically, the motion estimator 110 may generate a plurality of training samples indicating relations between a norm of an actually measured motion vector of the current block and a norm of an average motion vector of the neighboring blocks and estimate a norm of an average motion vector of the neighboring blocks, which corresponds to a training sample having the least error among the generated training samples, as the norm of the current block's motion vector.

Equation (6) expresses a relation between the norm of the current block's motion vector and the norm of the average motion vector of the neighboring blocks. Equation (7) expresses an error E between the norm x of the current block's motion vector and the norm y of the average motion vector of the neighboring blocks shown in Equation (6). Equation (8) expresses parameters with which the error E is minimum in Equation (7). The parameters may be obtained using a least mean square (LMS) method.

$$y = \alpha x + \beta (x_1, y_1), (x_2, x_2), \ldots, (x_n, y_n). \quad (6)$$

Here, y is the norm of the average motion vector of the neighboring blocks, x is the norm of the current block's motion vector, and $\alpha$ and $\beta$ are parameters representing the relations between the two norms x and y.

$$E = \sum_{i=1}^{n} \{y_i - (\alpha x_i + \beta)\}^2. \quad (7)$$

$$\alpha = \frac{n \sum_i x_i y_i - \sum_i x_i \sum_i y_i}{n \sum_i x_i^2 - \left(\sum_i x_i\right)^2}, \quad (8)$$

$$\beta = \frac{\sum_i y_i \sum_i x_i^2 - \sum_i x_i \sum_i x_i y_i}{n \sum_i x_i^2 - \left(\sum_i x_i\right)^2}.$$

The parameters $\alpha$ and $\beta$ in Equation (8) are an $\alpha$ value with which the differentiation of the error E with respect to $\alpha$ is 0 and $\beta$ value with which the differentiation of the error E with respect to $\beta$ is 0. Stated differently, the parameters $\alpha$ and $\beta$ may be used for a training sample with respect to which the error E is minimum.

After estimating the norm of the current block's motion vector, the motion estimator 110 calculates a posterior probability of the estimated norm of the current block's motion vector with respect to each of multiple reference frames using the norm of the current block's motion vector as a feature vector in operation S101. Thereafter, the motion estimator 110 selects a reference frame giving the maximum posterior probability from among the multiple reference frames and performs motion estimation on the current block using the selected reference frame in operation S102.

Calculating the posterior probability in operation S101 may include, as described above with reference to Equations (5) and (6), calculating a prior probability of the estimated norm of the current block's motion vector with respect to each reference frame, calculating a PDF of the norm of the current block's motion vector with respect to the reference frame, and calculating the posterior probability of the norm of the current block's motion vector with respect to the reference frame based on the prior probability and the PDF.

As described above, according to the motion estimation method illustrated in FIG. 10, one optimal reference frame may be selected from among multiple reference frames for a current block using an estimated norm of the current block's motion vector. Motion estimation may be performed using only the selected reference frame without using the other reference frames, so that the motion estimation can be performed faster compared to conventional motion estimation using multiple reference frames.

Figure 12:
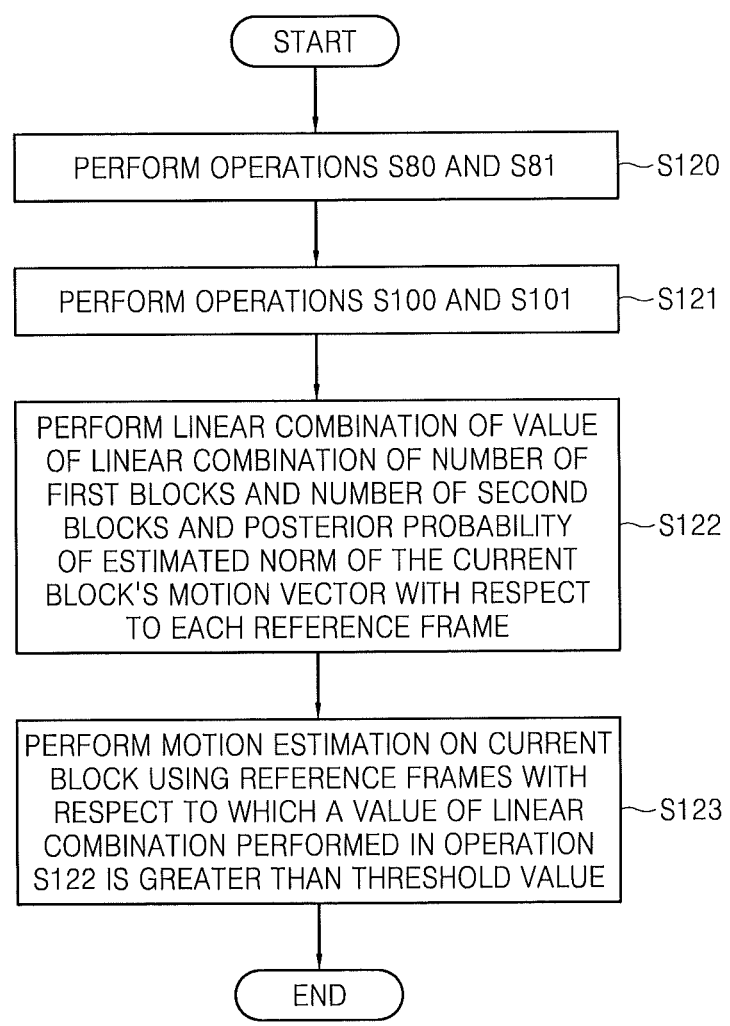
FIG. 12 is a flowchart of a motion estimation method using multiple reference frames according to other embodiments of the present invention.

FIG. 12 is a flowchart of motion estimation methods using multiple reference frames according to some embodiments of the present invention. The motion estimation methods illustrated in FIG. 12 include a combination of the motion estimation method illustrated in FIG. 8 and that illustrated in FIG. 10 and will be described with reference to FIGS. 1, 8, 10, and 12 below.

The motion estimator 110 analyzes the reference indexes of neighboring coded blocks of a current block and the reference indexes of a block corresponding to the current block in a previous frame and of neighboring blocks of the block, as shown in operation S80 of FIG. 8, and calculates a value of first linear combination of the number of first blocks having the same reference index among the neighboring blocks of the current block and the number of second blocks having the same reference index among the block corresponding to the current block and its neighboring blocks in the previous frame, as shown in operation of S81 of FIG. 8 in operation of S120. Since operations corresponding to S80 and S81 have been described with reference to FIG. 8, detailed descriptions thereof will be omitted here.

Next, the motion estimator 110 estimates a norm of the current block's motion vector based on a norm of an average motion vector of the neighboring blocks of the current block, as shown in operation S100 of FIG. 10, and calculates a posterior probability of the estimated norm of the current block's motion vector with respect to each of multiple reference frames using the norm of the current block's motion vector as a feature vector, as shown in operation S101 of FIG. 10, in operation S121. Since operations corresponding to blocks 100 and 101 have been described with reference to FIG. 10, detailed descriptions thereof will be omitted here.

Next, the motion estimator 110 performs second linear combination of the value of the first linear combination of the number of first blocks and the number of second blocks and the posterior probability of the estimated norm of the current block's motion vector with respect to each reference frame in operation S122. Here, the value of the first linear combination and the posterior probability may be multiplied by different weights, respectively. At this time, a weight for the value of the first linear combination may be greater than a weight for the posterior probability in order to reduce the influence of the estimated norm of the current block's motion vector which is influenced by a reference frame that has just been coded in an effect like scene change.

The second linear combination of the value of the first linear combination and the posterior probability of the estimated norm of the current block's motion vector with respect to each reference frame is expressed by Equation (9):

Priority[ref_idx]=$W_{MP}$·MP[ref_idx]+$W_{RP}$·RP[ref_idx], for ref_idx∈{0, 1, . . . , $r$–1}, (9)

where $W_{RP}$ is a weight for the value of the first linear combination of the number of first blocks and the number of second blocks, $W_{MP}$ is a weight for the posterior probability of the estimated norm of the current block's motion vector with respect to each reference frame, RP[ref_idx] numerically represents NRFC that has been described in Equation (3), and MP[ref_idx] numerically represents the posterior probability of the estimated norm of the current block's motion vector that has been described in Equation (5).

MP[ref_idx] representing the posterior probability of the estimated norm of the current block's motion vector in Equation (9) is expressed by Equation (10):

$$MP[\text{ref\_idx}] = \frac{P(NMV \mid \text{ref\_idx}) \cdot P(\text{ref\_idx})}{\text{Max}\{P(NMV \mid k) \cdot P(k)\}}, \quad (10)$$

for ref_idx, $k \in \{0, 1, \ldots, r-1\}$.

In Equation (10), the posterior probability MP[ref_idx] is normalized to a maximum value of 1. Equation (10) is provided to compare posterior probabilities of the estimated norm of the current block's motion vector with respect to the multiple reference frames, respectively.

After calculating values of the second linear combination with respect to the respective multiple reference frames in operation S122, the motion estimator 110 performs motion estimation on the current block using a reference frame with respect to which a value of the second linear combination is greater than a predetermined threshold value in operation S123. At this time, when there are a plurality of reference frames with respect to which values of the second linear combination are greater than the threshold value, motion estimation may be sequentially performed on those reference frames according to the descending order of values of the second linear combination because a reference frame giving the greater second linear combination value has more probability of being an optimal reference frame for the current block.

Figure 13:
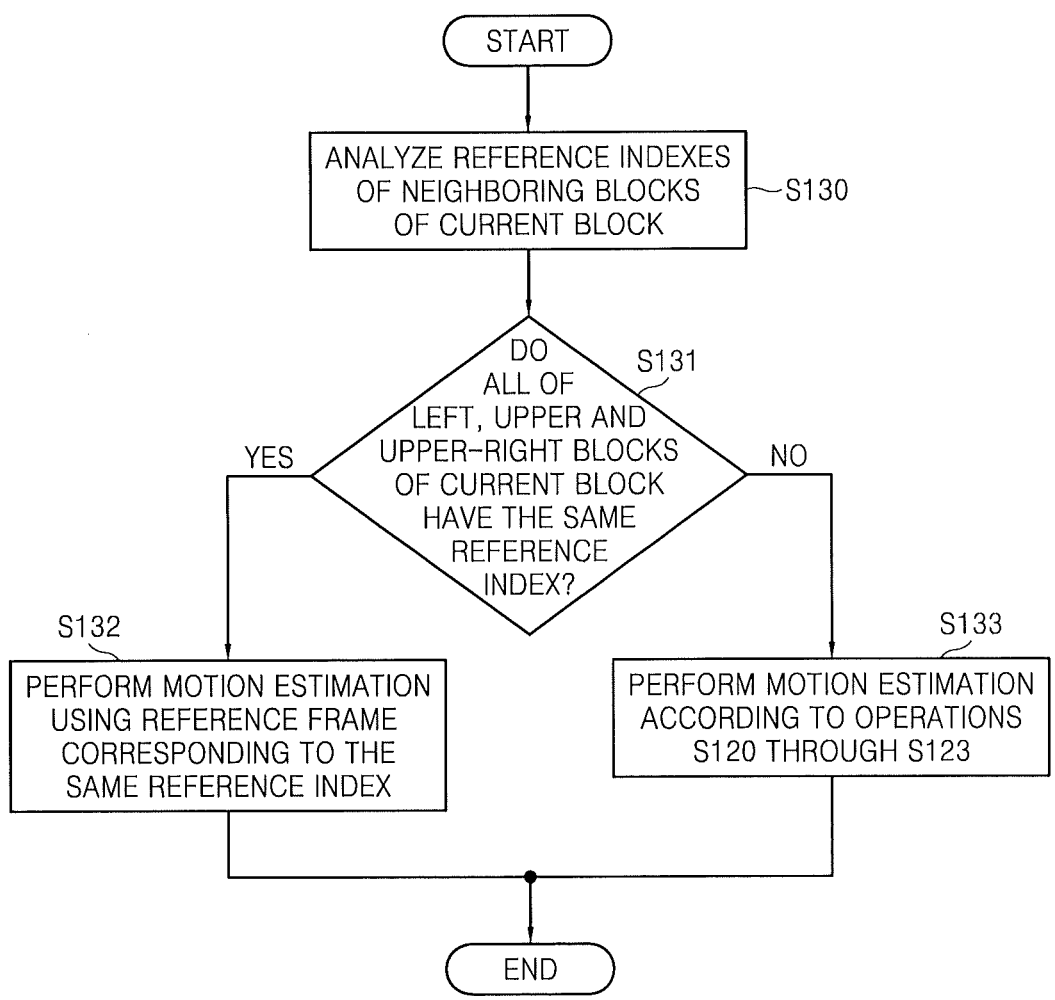
FIG. 13 is a flowchart of a motion estimation method using multiple reference frames according to yet other embodiments of the present invention.
Figure 14:
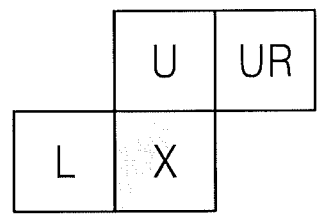
FIG. 14 is a diagram of an example of a current block and neighboring blocks which are used in the motion estimation method illustrated in FIG. 13.

FIG. 13 is a flowchart illustrating operations according to motion estimation methods using multiple reference frames according to some embodiments of the present invention. FIG. 14 is a diagram of an example of a current block X and neighboring blocks L, U, and UR, which are used in motion estimation methods illustrated in FIG. 13. The motion estimation methods illustrated in FIG. 13 will be described with reference to FIGS. 1, 8, 10, and 12 through 14.

The motion estimator 110 analyzes reference indexes of the neighboring blocks, i.e., the left block L, the upper block U, and the upper-right block UR of the current block X in operation 5130. A determination is made regarding whether all of the left block L, the upper block U, and the upper-right block UR of the current block X have the same reference index in operation S131.

When it is determined that all of the left block L, the upper block U, and the upper-right block UR of the current block X have the same reference index, the motion estimator 110 performs motion estimation on the current block X using only a reference frame corresponding to the reference index in operation 5132. However, when it is determined that all of the left block L, the upper block U, and the upper-right block UR do not have the same reference index, the motion estimator 110 performs motion estimation on the current block X according to blocks 120 through 123 illustrated in FIG. 12 in operation S 133.

Figure 15:
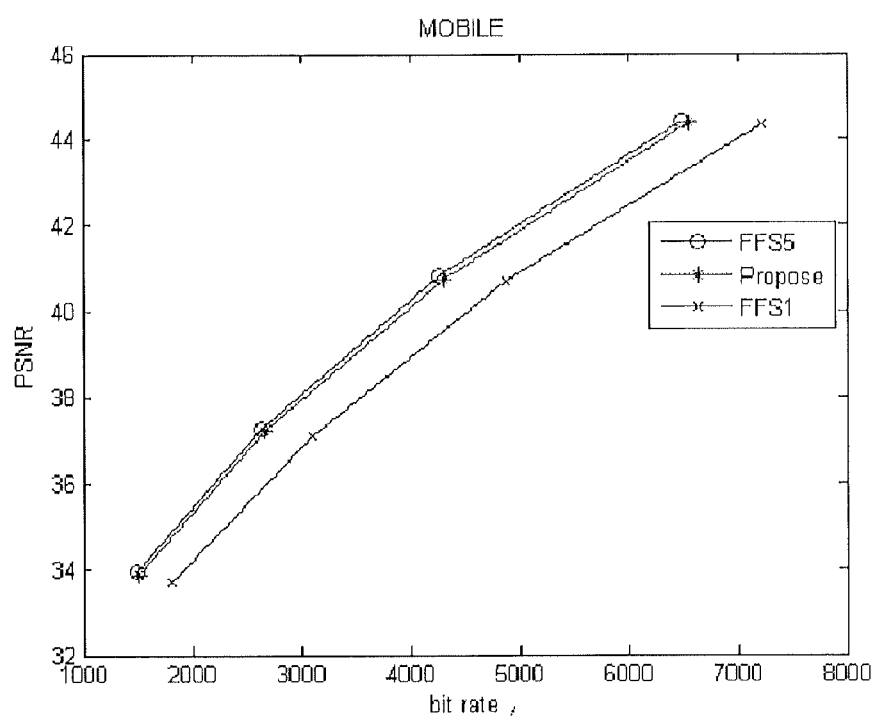
FIG. 15 is a graph showing the effect of a motion estimation method using multiple reference frames according to some embodiments of the present invention with respect to a Mobile common intermediate format (CIF) sequence.
Figure 16:
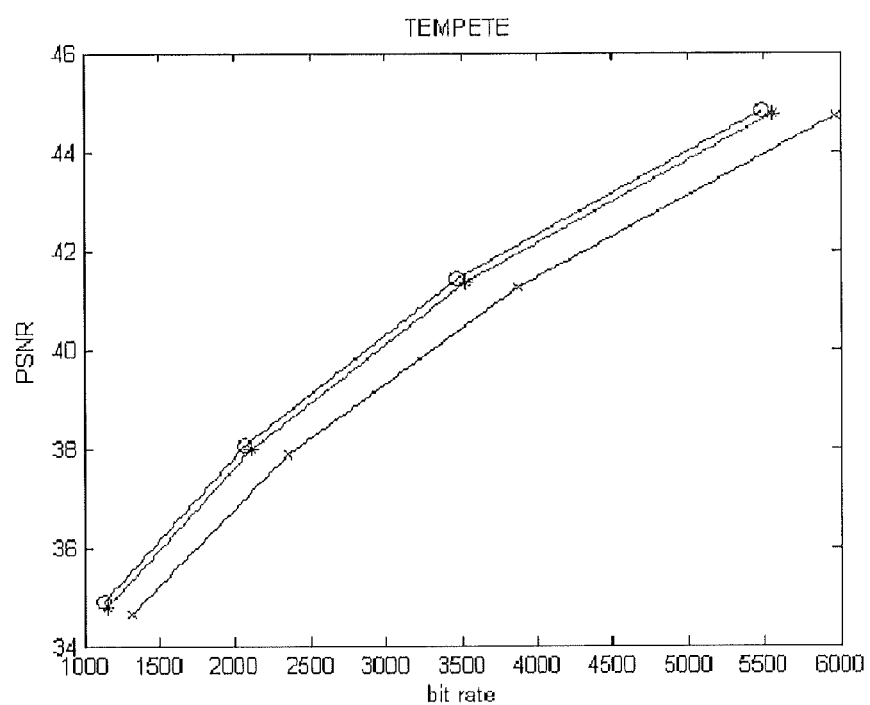
FIG. 16 is a graph showing the effect of a motion estimation method using multiple reference frames according to some embodiments of the present invention with respect to a Tempete CIF sequence.
Figure 17:
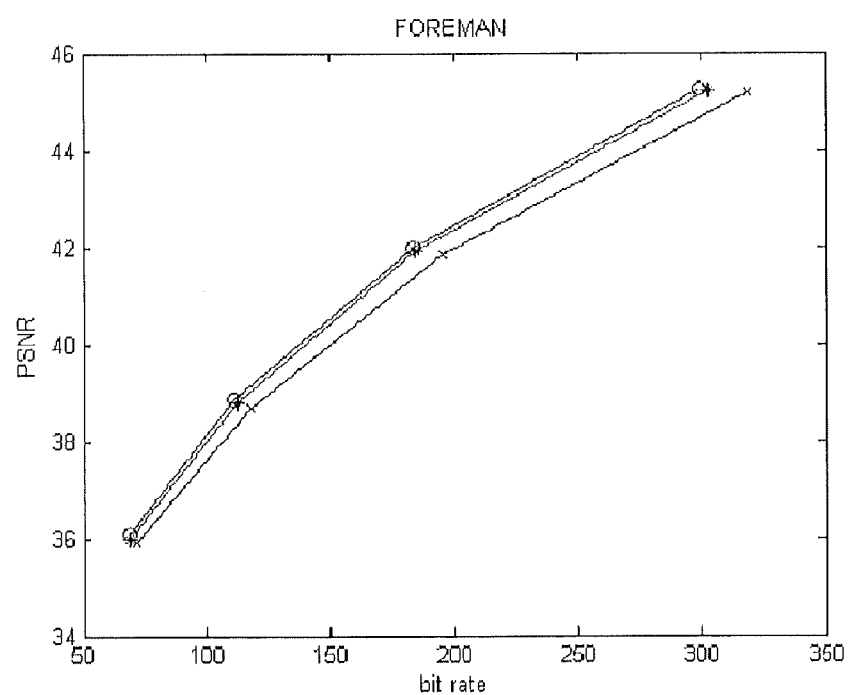
FIG. 17 is a graph showing the effect of a motion estimation method using multiple reference frames according to some embodiments of the present invention with respect to a Foreman quarter CIF (QCIF) sequence.

FIG. 15 is a graph showing the effect of a motion estimation method using multiple reference frames according to some embodiments of the present invention with respect to a Mobile common intermediate format (CIF) sequence. FIG. 16 is a graph showing the effect of a motion estimation method using multiple reference frames according to some embodiments of the present invention with respect to a Tempete CIF sequence. FIG. 17 is a graph showing the effect of a motion estimation method using multiple reference frames according to some embodiments of the present invention with respect to a Foreman quarter CIF (QCIF) sequence.

In the graphs of FIGS. 15 through 17, line FFS5 shows the peak signal-to-noise ratio (PSNR) against a bit rate when motion estimation is performed on a current block using five reference frames. Line FFS1 shows the PSNR against a bit rate when motion estimation is performed on a current block using a single reference frame. Referring to FIGS. 15 through 17, the PSNR obtained using the motion estimation method according to some embodiments of the present invention is similar to the PSNR obtained when motion estimation is performed on all five reference frames with respect to all of the Mobile CIF, Tempete CIF and Foreman QCIF sequences.

As explained so far, according to some embodiments of the present invention, faster motion estimation is realized in video compression standards including H.264/AVC, in which motion estimation is performed using multiple reference frames.

Some embodiments of the present inventive concept can be embodied in hardware, software, firmware or combination thereof. When the motion estimation methods according to some embodiments of the present inventive concept are embodied in software, they can be embodied as computer readable codes and/or programs on a computer readable recording medium. Motion estimation methods according to some embodiments of the present inventive concept may be embodied by executing the computer program for executing the motion estimation methods stored in the computer readable recording medium.

The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The program codes for executing a method of upgrading an operation program in an RFID system may be transmitted in the form of carrier waves (such as data transmission through the Internet).

The computer readable recording medium can also be distributed over network coupled computer systems so that the computer readable code is stored and/or executed in a distributed fashion. Also, functional programs, codes, and/or code segments for accomplishing the present invention can be easily construed by programmers skilled in the art to which the present invention pertains.

In the above embodiments of the present invention, motion estimation methods have been described using an encoder based on H.264/AVC, but the scope of the present invention is not restricted to those embodiments and the present invention can be applied to other various types of motion estimation using multiple reference frames.

The encoder 100 as described above for executing motion estimation methods according to some embodiments of the present inventive concept may be packed in various types of packages. For example, the various packages may include PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), and/or Wafer-Level Processed Stack Package (WSP), among others.

Some embodiments provide that the encoder 100 may be embedded in the electronic devices that compress and/or encode image signals. An electronic device may be a camera, a TV, an LCD, and/or a PDP, among others. The electronic device may also be a portable computer, a digital camera, a PDA (personal digital assistance), a mobile phone, a smart phone, a MP3 player, a PMP (portable multimedia player), and/or an automotive navigation system, among others, but it is not restricted thereto.

While the present invention has been particularly shown and described with reference to exemplary embodiments thereof, it will be understood by those of ordinary skill in the art that various changes in forms and details may be made therein without departing from the spirit and scope of the present invention as defined by the following claims.

What is claimed is:

1. A motion estimation method using a plurality of reference frames, the method comprising: analyzing a plurality of reference indexes of a current block, the plurality of reference indexes indicating reference frames of neighboring blocks that have already been coded and a plurality of reference indexes of a block corresponding to the current block and its neighboring blocks in a previous frame; performing a first linear combination of a number of first blocks that have a same reference index among the neighboring blocks of the current block, and a number of second blocks that have the same reference index among the block corresponding to the current block and its neighboring blocks in the previous frame; estimating a norm of a motion vector of the current block based on a norm of an average motion vector of the neighboring blocks of the current block; calculating a posterior probability of the estimated norm of the motion vector of the current block with respect to each of the plurality of reference frames using the estimated norm of the motion vector of the current block as a feature vector; performing a second linear combination of a value of the first linear combination and the posterior probability of the estimated norm of the motion vector of the current block with respect to each reference frame and performing motion estimation on the current block sequentially using the plurality of reference frames according to values of the second linear combination; and calculating a probability distribution of the reference frame index using an equation:

$$P(i_X; X) = P_X(i_X) = \frac{e^{-a(i_X+1)}}{\sum_{j=0}^{r-1} e^{-a(j+1)}} \sum_{k=0}^{r-1} P_X(i_x) =$$

$$\sum_{k=0}^{r-1} P_X(i_X = k)\hat{P}_k(N) + \sum_{k=0}^{r-1} P_X(i_X = k)\hat{P}_k^C(N) = \Gamma_N \Gamma_N^C,$$

-continued for $$i_X \in R, R = \{0, \ldots, r-1\}, a > 0,.$$

2. The motion estimation method of claim 1, wherein performing the first linear combination comprises multiplying the number of first blocks and the number of second blocks by different weights, respectively; and
   wherein a weight for the number of first blocks is greater than a weight for the number of second blocks.

3. The motion estimation method of claim 1, wherein performing the second linear combination and performing the motion estimation comprise multiplying the value of the first linear combination and the posterior probability by different weights, respectively; and
   wherein the weight for the second linear combination is greater than the weight for the posterior probability.

4. The motion estimation method of claim 1, wherein estimating the norm of the motion vector of the current block comprises:
   generating a plurality of training samples representing relations between a norm of a measured motion vector of the current block and a norm of an average motion vector of the neighboring blocks; and
   estimating a norm of an average motion vector of the neighboring blocks that corresponds to a training sample having a minimum error among the plurality of training samples, as the norm of the motion vector of the current block.

5. The motion estimation method of claim 1, wherein calculating the posterior probability comprises:
   calculating a prior probability of the estimated norm of the motion vector of the current block with respect to each reference frame;
   calculating a probability density function of the estimated norm of the motion vector of the current block with respect to the reference frame; and
   calculating the posterior probability of the estimated norm of the motion vector of the current block with respect to the reference frame based on the prior probability and the probability density function.

6. A motion estimation method using a plurality of reference frames, the method comprising: analyzing a plurality of reference indexes of a current block, the plurality of reference indexes indicating reference frames of neighboring blocks that have already been coded and a plurality of reference indexes of a block corresponding to the current block and its neighboring blocks in a previous frame; performing a first linear combination of a number of first blocks that have a same reference index among the neighboring blocks of the current block, and a number of second blocks that have the same reference index among the block corresponding to the current block and its neighboring blocks in the previous frame; estimating a norm of a motion vector of the current block based on a norm of an average motion vector of the neighboring blocks of the current block; calculating a posterior probability of the estimated norm of the motion vector of the current block with respect to each of the plurality of reference frames using the estimated norm of the motion vector of the current block as a feature vector; performing a second linear combination of a value of the first linear combination and the posterior probability of the estimated norm of the motion vector of the current block with respect to each reference frame and performing motion estimation on the current block sequentially using the plurality of reference frames according to values of the second linear combination; and calculating the posterior probability of the estimated norm of the current block's motion vector using an equation:

$$MP[ref\_idx] = \frac{P(NMV \mid ref\_idx) \cdot P(ref\_idx)}{\text{Max}\{P(NMV \mid k) \cdot P(k)\}},$$

for $$ref\_idx, k \in \{0, 1, \ldots, r-1\}.$$

\* \* \* \* \*